United States Patent Office 2,858,599
Patented Nov. 4, 1958

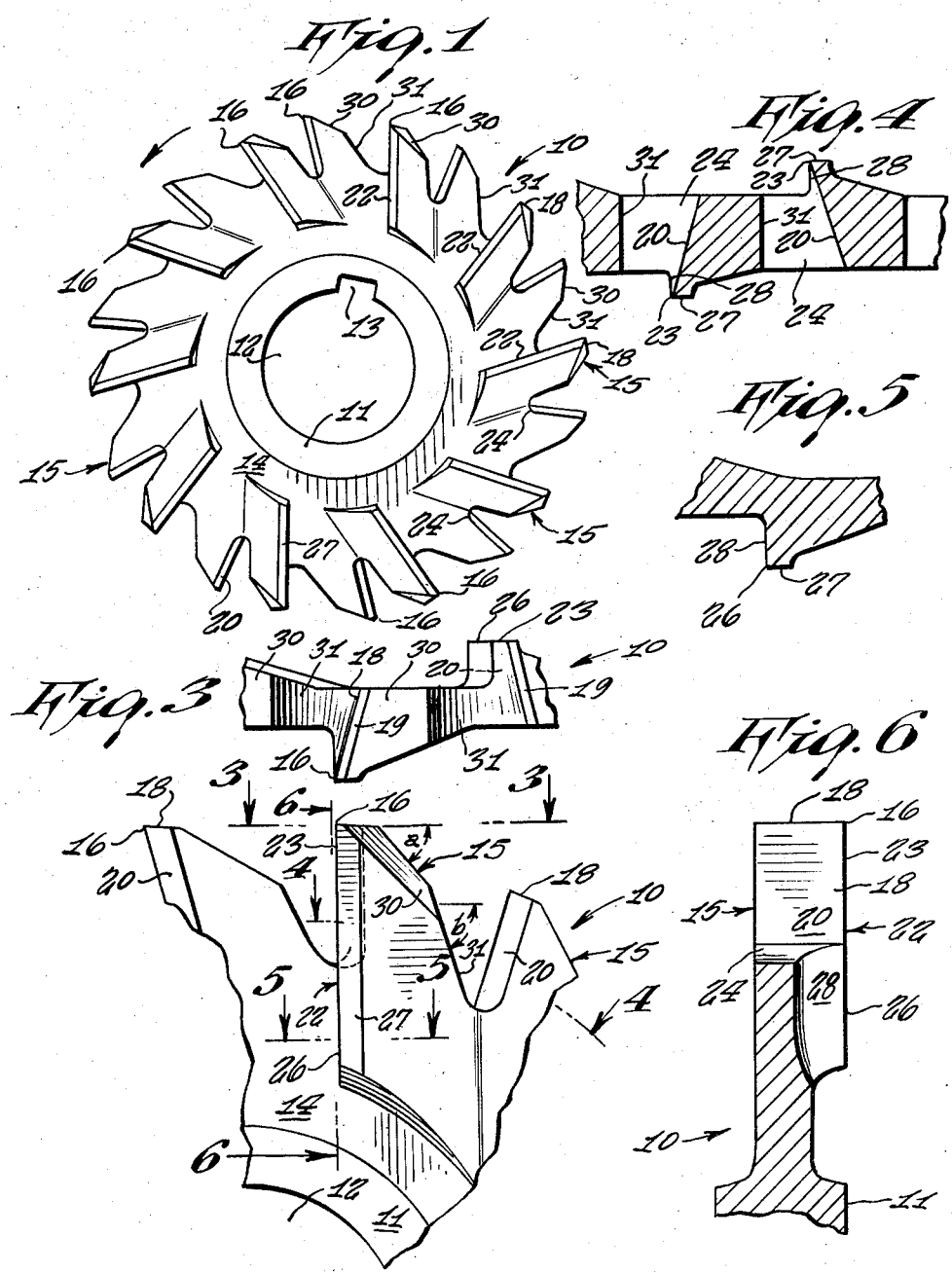

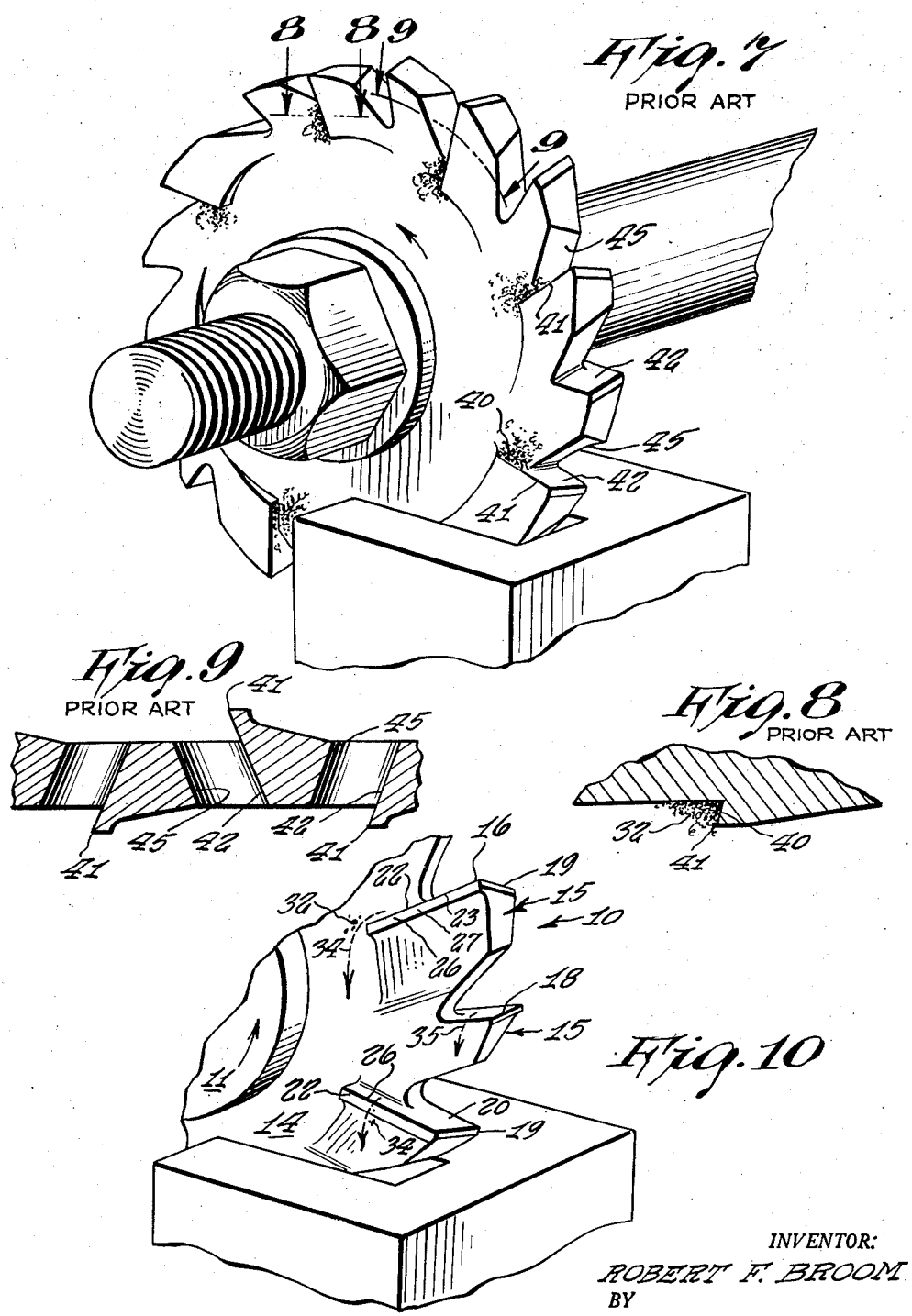

2,858,599
MILLING CUTTER

Robert F. Broom, Morristown, N. J., assignor to Austenal, Inc., a corporation of New York Application January 18, 1956, Serial No. 560,022

3 Claims. (Cl. 29—103)

The present invention relates to rotary milling cutters and more particularly to staggered-tooth side milling cutters which are provided with a series of staggered teeth having both peripheral and lateral or side cutting edges.

A milling cutter in accordance with the invention is characterized by a novel configuration for the centrally inwardly disposed portions of the side or lateral cutting edges and by a novel configuration for the surfaces behind each tooth which determine the secondary clearance angle. These novel configurations individually facilitate the discharge of cuttings and they cooperate to prevent the accumulation of chips during the operation of the cutter while, at the same time, they advantageously permit the cutter to be produced by conventional casting methods without resorting to the usual machining operations which are required in the manufacture of a cutter of standard design, whether by forging or other methods.

Generally, the invention comprises a milling cutter having the usual central hub portion with a keyway to permit the cutter to be fixed to the arbor of a milling machine. The cutter is provided with the customary series of generally radially outwardly extending cutting teeth all forwardly inclined to provide the standard angle of positive rake with respect to the direction of rotation of the cutter. The peripheral cutting edges at the outer extremities of the teeth may all be circumscribed by a cylindrical surface coaxial with the rotational axis of the arbor and are alternately oppositely inclined at the usual helix angle of about 13 degrees each with respect to an individual radial plane passing through the rotational axis and a corner of the particular tooth. The lateral or side cutting edges extend inwardly from the peripheral cutting edges, and alternate teeth have lateral cutting edges formed on the same side of the cutter, the lateral cutting edges of adjacent teeth being on the opposite sides to provide a staggered-tooth side cutter of substantially standard type and fully interchangeable with other staggered-tooth side cutters.

In conventional milling cutters of this type, it has heretofore been the practice to provide a milled undercut adjacent to each lateral or side cutting edge and extending from the portion of each lateral cutting edge adjacent to the root of the tooth to the inner end of the lateral cutting edge. Thus, in conventional cutters of this type, the entire lateral cutting edge is defined by the intersection of two planes which make an acute dihedral angle with each other, one of the planes being normal to the rotational axis of the cutter, the other being the leading face of the tooth and a continuation thereof both disposed at the helix angle of 13° to the rotation axis.

The present invention is based on the discovery that, in practice, chips tend to accumulate in this undercut during operation of the cutter and to interfere with the efficient operation of the inner portions of the lateral cutting edges.

In a milling cutter in accordance with the present invention, however, this inner portion of each lateral cutting edge is not undercut, but instead is so shaped that its inner portion is defined by the intersection of two planes, one substantially normal to the rotational axis of the cutter and the other so disposed that the two intersecting planes make a dihedral angle of at least 90° with each other. Preferably, this other plane is substantially parallel to the rotational axis so that the dihedral is approximately 90°. This has been found to produce a peculiar and unusual configuration for the lateral cutting edges whereby the accumulation of chips and the clogging of the cutter are avoided.

In a cutter in accordance with the invention, a further feature is included which cooperates with the lateral cutting edges and assists in preventing clogging of the cutter. In conventional cutters, the plane which defines the secondary clearance angle in back of each tooth is ordinarily parallel to the peripheral cutting edge of the tooth which is immediately behind this plane. This is caused by the usual practice of forming this surface by means of a single milling operation which cuts both the leading face of the tooth and the secondary clearance surface for the tooth immediately ahead at the same time. As a result, this portion of the space between adjacent teeth is of constant cross-sectional area proceeding from the lateral cutting edge in a direction parallel to the rotational axis of the cutter, toward the other side of the cutter. This causes a tendency for chips to accumulate in this space and to clog the cutter.

In accordance with this further feature of the invention, the plane behind each tooth which defines the secondary clearance angle is made parallel to the rotational axis of the cutter so that it is inclined with respect to the leading face of the tooth immediately behind it. This configuration causes the space between adjacent teeth to diverge outwardly away from the lateral cutting edge so that there is a tendency to feed chips away from the lateral cutting edge during operation of the cutter. Thus there is obtained a marked improvement in the operation of the cutter with respect to clogging of the cutting edges.

Accordingly, it is an object of the invention to provide a staggered-tooth side cutter of this character in which the accumulation of chips both at the inner and outer portions of its lateral or side cutting edges is avoided and its cutting efficiency is thereby materially improved.

A further object of the invention is the provision of a cutter of this type which may be formed by conventional casting methods and which does not require costly undercutting of the inner portions of its lateral cutting edges or machining of the spaces between adjacent teeth.

Other objects, features and advantages of the invention will become apparent upon reading the following specification together with the accompanying drawing forming a part hereof.

Referring to the drawing:

Figure 1 is a side elevational view of a milling cutter embodying the invention.

Figure 2 is an enlarged fragmentary view of the cutter of Fig. 1, illustrating details of construction.

Figure 3 is a plan view taken along the line 3—3 of Fig. 2.

Figure 4 is a developed cylindrical sectional view through two of the teeth taken along the circular arc 4—4 of Fig. 2.

Figure 5 is a fragmentary plan sectional view taken along the line 5—5 of Fig. 2.

Figure 6 is a fragmentary view in sectional elevation, taken along the line 6—6 of Fig. 2 looking in the direction of the arrows.

Figure 7 is a perspective view showing a conventional cutter of standard design mounted on the arbor of a milling machine and taking a cut in a workpiece.

Figure 8 is a fragmentary plan sectional view of one the teeth of the conventional cutter of Fig. 7, taken along the line 8—8 of Fig. 7 and illustrating the accumulation of chips in the undercut referred to above.

Figure 9 is a developed cylindrical sectional view through two of the teeth of the conventional cutter of Figs. 7 and 8 taken along the circular arc 9—9 of Fig. 7.

Figure 10 is a fragmentary perspective view showing a cutter in accordance with the invention taking a cut in a workpiece and illustrating the operation of the improved lateral cutting edge in avoiding the accumulation of chips and preventing clogging of the cutter.

Referring to Fig. 1, there is shown a cutter which is designated generally as 10. The cutter comprises a central hub portion 11 which has a circular shaft hole 12 and a keyway 13 formed therein for mounting the cutter on the arbor of a milling machine. The hub portion 11 of the cutter is surrounded by an annular disc portion 14 which is thinner than the hub portion 11 and is concentric with the shaft hole 12.

The cutter is provided with a series of integrally formed cutting teeth, each designated generally as 15, which extend outwardly from the disc portion 14 of the cutter 10. Each tooth is forwardly inclined in the direction of rotation of the cutter to provide the customary positive angle of rake of about 15°, the angle of rake being measured with respect to a radial plane passing through the rotational axis of the cutter 10 and the foremost or leading polyhedral corner of each tooth 15. The rotational axis of the cutter 10 is coincident with the longitudinal axis of the circular shaft hole 12.

Each tooth 15 has a peripheral cutting edge 18 which is defined by the intersection of two surfaces. One of these surfaces is disposed at the outer end of each tooth and is designated 19, the surface 19 being either cylindrical and concentric with the rotational axis of the cutter or being plane and substantially tangent to a cylinder circumscribing the cutting edge or inclined with respect to the tangent plane. The other surface, designated 20, constitutes the leading face of the tooth. The surface 20 of each tooth is inclined so that the peripheral cutting edge 18 makes a helix angle of about 13° with a plane normal to the rotational axis of the cutter, the cutting edges 18 of adjacent teeth being oppositely inclined in conformity with the staggered-tooth arrangement illustrated.

A lateral or side cutting edge 22 extends inwardly from the peripheral cutting edge 18 of each tooth toward the central disc portion 14 of the cutter. The lateral cutting edge 22 of each tooth 15 is continuous and comprises an outer portion 23 which extends outwardly of the root 24 of the tooth to the peripheral cutting edge 18. The lateral cutting edge 22 also comprises an inner portion 26 which extends inwardly of the root 24 of the tooth 15 to the disc portion 14 of the cutter.

The outer portion 23 of lateral cutting edge 22 is defined by the intersection of two planes. One of the planes is normal to the rotational axis of the cutter and defines the lateral surfaces 27 of the series of teeth. The other plane defines the leading face 20 of each tooth. These two planes make an acute dihedral angle of 77° with each other, assuming the helix angle to be 13° as described above.

The inner portion 26 of the cutting edge 22 is likewise defined by the intersection of two planes, one of the planes being the same plane which defines the lateral surfaces 27 of the series of teeth. The outer plane, however, is a plane parallel to the rotational axis of the cutter and which defines the leading face 28 of the inner cutting edge portion of each tooth. Thus, in the example shown, the inner portion 26 of the cutting edge 22 is defined by the intersection of two planes which make a dihedral angle of 90° with each other, as may best be seen in Fig. 5.

Immediately behind the peripheral cutting edge 18 of each tooth 15 there are two plane surfaces. One of these surfaces, designated 30, defines the primary clearance angle $a$ which is about 30° and the other surface 31 defines the secondary clearance angle $b$ which is approximately 60°. In contradistinction to the usual practice, surface 31 which defines the secondary clearance angle $b$ is parallel to the rotational axis of the cutter. This may best be seen in Fig. 4. From the developed cylindrical section which is shown in Fig. 4, it will be apparent that the space between adjacent ones of the teeth 15 increases in area proceeding from the lateral cutting edge 22 toward the opposite side of the cutter in a direction parallel to the rotational axis of the cutter.

The novel form of construction described above may be compared to the conventional cutter illustrated in Figs. 7, 8 and 9. The leading face 40 which in part defines the inner portion of lateral cutting edge 41 is a continuation of the leading face 42 of the tooth. The leading face 40, together with the lateral surface 43 of the cutter, together define an undercut or pocket 44 in which chips tend to accumulate as shown in Figs. 7 and 8.

Additionally, the space between adjacent teeth which is defined by the leading face 42 of one tooth and the secondary clearance defining surface 45 of the tooth immediately ahead, is of constant cross-sectional area proceeding from the lateral cutting edge 41 toward the other side of the cutter in a direction parallel to the rotational axis of the cutter.

In the cutter in accordance with the invention, there is no pocket such as 44 in which chips may accumulate. The space immediately ahead of the face 28 adjacent to the inner portion 26 of lateral cutting edge 22 communicates at its outer end with a space defined by surfaces 20 and 31. This space defined by surfaces 20 and 31, as described above, diverges away from the lateral cutting edge 22 so that there is a tendency to feed chips continuously away from the lateral cutting edge 22 during operation of the cutter. This avoids clogging of the cutter as contrasted with the configuration of the conventional cutter shown in Figs. 7, 8 and 9. The operation of the cutter embodying the invention is shown in Fig. 10. The chips 32 leave the surfaces 28 as indicated by the arrows 34 and move away from the lateral cutting edges as indicated by arrows 35 without accumulating and clogging the cutter. While confined within the cut being taken in the workpiece, the chips are urged away from the cutting edge 22 by the divergent configuration of the space between surfaces 20 and 31.

From the foregoing, it will also be seen that the provision of surfaces which are parallel to the rotational axis of the cutter will greatly facilitate manufacture of the cutter by conventional casting methods such as the lost wax method, for example.

While I have dsecribed what I believe to be the best embodiments of my invention, it will be apparent to those skilled in the art that various changes and modifications may be made therein without departing from the scope of the invention as defined in the appended claims.

What is claimed is:

1. In a rotary staggered-tooth side milling cutter in which each tooth comprises a continuous lateral cutting edge, each lateral cutting edge comprising an outer portion which extends outwardly of the root of the tooth to the periphery of the cutter and an inner portion which extends inwardly of the root of the tooth toward the central portion of the cutter, the outer portion of said cutting edge being defined by the intersection of two planes which make an acute dihedral angle with each other, the improvement which comprises the provision of a configuration for said inner portion of said lateral cutting edge such that it is defined by the intersection of two planes which make a dihedral angle of at least 90 degrees with each other, one of said planes being a plane which is substantially normal to the rotational axis of said cutter and which is extended outwardly of the root of the tooth toward the periphery of said cutter, said one plane constituting one of said two planes which define said outer portion of said lateral cutting edge.

2. The improvement according to claim 1, wherein said two intersecting planes defining said inner portion of said lateral cutting edge are mutually perpendicular and in which the other of said two last-named planes is parallel to the rotational axis of said cutter.

3. In a rotary milling cutter of the staggered-tooth type in which each tooth comprises a continuous rectilinear lateral cutting edge, the improvement which comprises the provision of a lateral cutting edge which is defined by three planse having a common line of intersection, a first one of said planes being intersected by second and third planes to define said continuous cutting edge, said first plane being substantially normal to the rotational axis of said cuttre, said first and second planes intersecting at an acute dihedral angle with their line of intersection extending along the generally radially outwardly disposed portion of said cutting edge, and said first and third planes intersecting at a dihedral angle of at least 90 degrees with their line of intersection extending inwardly from and in alignment with the line of intersection of said first and second planes, whereby said cutter may be produced by casting methods.

References Cited in the file of this patent

UNITED STATES PATENTS

| | | |
|---|---|---|
| 998,174 | Hellgren | July 18, 1911 |
| 1,311,686 | Goddard | July 29, 1919 |
| 1,319,714 | Laurenz | Oct. 28, 1919 |
| 1,468,857 | Browand | Sept. 25, 1923 |
| 2,346,343 | Aber | Apr. 11, 1944 |
| 2,658,260 | Hage | Nov. 10, 1953 |